Figure 1:
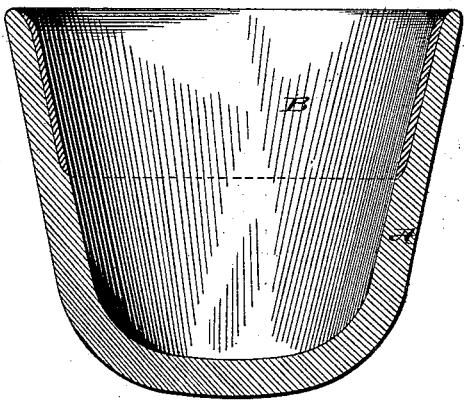

(No Model.)

T. A. ZELLERS.
GLASS POT.

No. 287,355. Patented Oct. 23, 1883.

Witnesses.
Jno. W. Stockett,
C. C. Poole

Inventor:
Theodore A. Zellers
per M. E. Dayton
Attorney.

UNITED STATES PATENT OFFICE.

THEODOR A. ZELLERS, OF OTTAWA, ILLINOIS, ASSIGNOR TO THE OTTAWA GLASS COMPANY, OF SAME PLACE.

GLASS-POT.

SPECIFICATION forming part of Letters Patent No. 287,355, dated October 23, 1883.

Application filed July 13, 1883. (No model.)

*To all whom it may concern:*

Be it known that I, THEODOR A. ZELLERS, of Ottawa, in the county of La Salle and State of Illinois, have invented certain new and useful Improvements in Glass-Pots; and I do hereby declare that the following is a full, clear, and exact description thereof, reference being had to the accompanying drawing, and to the letters of reference marked thereon, which form a part of this specification.

In the manufacture of window-glass and glass bottles the clay pots in which the glass is melted are composed of a mixture, in about equal parts, of raw clay and granulated burnt clay, the burnt clay being usually reduced to fineness suited to pass through a No. 10 or No. 12 sieve. The object of using a compound thus constituted is to produce a pot that shall have the desired strength, derived mainly from the more tenacious raw clay, and that shall at the same time have the property of resisting sudden changes of temperature without cracking, derived from the more porous burnt clay. Taking all the requirements of strength and porosity into account, the construction above indicated has been settled upon as best suited to the purposes of pots for melting glass, and is universally employed. The burnt clay, necessarily used with the raw clay to preserve the pot from cracking, is, however, subjected to a destructive effect from the action of the alkalies present in the fluxes used in fusing the glass, and pots of this class are therefore, as heretofore made, gradually disintegrated at the surface line of the molten liquid, (upon which, of course, the flux rides,) and are finally so far eaten away at this point as to become useless, while otherwise sound and uninjured.

The present invention has for its object to correct the difficulty above referred to, or, in other words, to provide a "glass-pot" possessing the usual characteristics, but suited to effectively resist the action of the alkali in the flux at the metal-line of the pot, and to thereby increase the durability of the article.

To this end the invention consists in a pot having its body constructed of the usual composition of raw and burnt clay, and provided at the metal-line with a lining or covering for the interior surface, composed of a mixture of raw and burnt clay in which the raw clay is materially in excess of the burnt clay, so as to be practically or relatively indestructible from the action of the fluxes present in the fused glass.

As also herein described, the invention further consists in a pot provided with a lining in which the burnt clay entering into the lining is reduced to greater fineness than that of the body of the pot, for reasons that will further appear.

In the accompanying drawing, the figure is a central vertical section of a glass-pot provided with my improvement, in which the lining is, for better illustration, distinguished from the body of the pot by opposite cross-hatching.

A is the body of the pot, and B is the lining. The body of the pot is, as above stated, constructed of the compound usually employed for this purpose, consisting of about equal parts of raw and burnt clay, the latter in granulated form, as stated, and the whole mixed and prepared and molded in the usual manner. The substance of the lining B is also composed of raw and burnt clay, mixed and prepared in the same or any proper manner, but containing a materially larger part of raw than of burnt clay. While this compound for the lining is in a plastic state, and the body of the pot is also in a sufficiently moist condition to allow of its adhesion thereto, the interior of the pot, opposite the metal-line, and for a distance extending a little above and below the normal level of the molten glass, is covered with the plastic lining compound to any desired thickness. After the lining has been applied, the pot is dried and made fit for use in the usual manner. In order to further increase the durability of the lining B, or its resistance to the alkaline properties of the flux, I prefer to reduce the burnt clay which is to enter into said lining to smaller particles than those of the body of the pot, and usually to a size obtained through a No. 30 sieve. By thus using more finely-reduced burnt clay for the lining, mixed with the raw clay in excess, as stated, not only is a less surface of the more destructible material exposed to the alkali, but when the originally-exposed particles are eaten out the surface of the pot is less broken, and smaller particles of the burnt clay are exposed to the further action of the alkali, so that the durability of the lining is materially increased.

Of course it is practicable to make the entire upper part of the pot of the composition above described as constituting the lining, and such construction is intended to be embraced in the following claims. As the more convenient method, however, and for other reasons, I prefer, first, to make the pot complete of the usual composition, and while still moist or plastic to add the lining as a superficial body merely. Thus applied, the lining unites perfectly with the main body of the pot, and forms therewith a wholly unitary structure, as if the whole were made of a single composition or substance. If desired that the finished pot shall be of no greater thickness by reason of the lining, as is preferable, the original pot or base may be made thinner where it is to receive the lining, so that after the lining has been added the pot will be of the usual thickness, as seen in the drawing. This, however, is not important.

In practice I have found that the lining compound may advantageously contain, say, three parts of raw clay, and, say, two parts of burnt clay; but I do not wish to be restricted to any precise proportions, inasmuch as these may be varied somewhat in accordance with the particular quality of the clay or flux. It may be stated generally, however, that the composition proposed as a lining is not adapted to form the body of the pot, because of its tendency to crack from changes of temperature, to avoid which the body is constructed of the materials mentioned in about equal proportions or parts, as first above stated. The body and lining therefor constitute two essentially dissimilar substances, each in its particular location operating to oppose particular agencies of destruction, and both contributing to make the pot more durable and serviceable.

I claim as my invention—

1. The glass-pot described, having its body constructed of raw and burnt clay, combined in the usual or about equal proportions, and having its interior portion, opposite the metal-line, constructed of a composition of raw and burnt clay, in which the raw clay is materially in excess of the burnt clay, substantially as and for the purpose set forth.

2. The combination, with the glass-pot body constructed of raw and burnt clay, in the usual or about equal proportions, of which the burnt clay is coarsely granular, of the upper portion of the pot, having its interior part or surface constituted of a composition of the same material, but having the burnt clay more finely ground and the raw clay in larger proportion than in the body of the pot, substantially as described.

3. The glass-pot described, having its body composed of raw clay and coarsely granular burnt clay, and the interior surface, opposite the metal-line, composed of raw clay and burnt clay reduced to smaller particles than those entering into the body of the pot, substantially as described.

In testimony that I claim the foregoing as my invention I affix my signature in presence of two witnesses.

THEODOR A. ZELLERS.

Witnesses:
WILLIAM M. STANLEY,
CYRUS KEHR.